United States Patent

Kramer

[15] 3,635,255

[45] Jan. 18, 1972

[54] CORRUGATED FLEXIBLE HOSE WITH INTEGRAL SOCKET AND APPARATUS FOR FORMING SAME

[72] Inventor: Vance M. Kramer, c/o Crushproof Tubing Co., McComb, Ohio 45858

[22] Filed: Sept. 26, 1969

[21] Appl. No.: 861,320

[52] U.S. Cl. ..........................138/122, 138/109, 285/DIG. 4
[51] Int. Cl. .......................................F16l 11/06, F16l 11/10
[58] Field of Search...............138/122, 109, 134; 285/DIG. 4

[56] References Cited

UNITED STATES PATENTS

| 319,144 | 6/1885 | Stephens et al. | 285/DIG. 4 |
| 809,880 | 1/1906 | Woolldridge | 138/134 X |
| 1,296,016 | 3/1919 | Smith | 138/109 X |

FOREIGN PATENTS OR APPLICATIONS

| 349,784 | 10/1960 | Switzerland | 138/109 |

Primary Examiner—Herbert F. Ross
Attorney—Bosworth, Sessions, Herrstrom and Cain

[57] ABSTRACT

A flexible length of hose or tubing formed of helical circumferential corrugations and having means integral therewith at one end for threaded connection to another similarly constructed length in end-to-end relation. The internal threads of the helical corrugations at the end having the receptacle or female connection portion are of approximately the same crest and root diameter as the external threads of the rest of the hose to provide a threaded socket for the opposite end of a similarly constructed hose length. A core member is provided for forming the enlarged female socket at one end by the cording process. The core member defines helical threads for progressively enlarging the crest and root diameter of the internal threads of the hose from their smaller dimension to their maximum dimension while maintaining the same pitch to form the female receptacle for the connection.

3 Claims, 7 Drawing Figures

3,635,255

INVENTOR.
VANCE M. KRAMER
BY Bosworth, Sessions,
Herrstrom & Cain
ATTORNEYS

INVENTOR.
VANCE M. KRAMER
BY Bosworth, Sessions
Herrstrom & Cain
ATTORNEYS 3,635,255

CORRUGATED FLEXIBLE HOSE WITH INTEGRAL SOCKET AND APPARATUS FOR FORMING SAME

BACKGROUND OF THE INVENTION

This invention relates to helically corrugated flexible tubing, especially rubber tubing of the type disclosed in U.S. Pat. No. 2,832,096. More particularly the invention relates to an improvement in the construction of such tubing and in the apparatus for the forming thereof, wherein one end of each length or segment of such hose is formed to provide a threaded female connection or socket adapted to receive the opposite end of another similarly constructed hose length.

As disclosed in U.S. Pat. No. 2,832,096, helical corrugated tubing may be made by first drawing an extruded sleeve of raw uncured rubber axially over an elongated rotatable mandrel with a core strip wrapped around it to form a single continuous external thread. The uncured rubber sleeve is forced into the helical groove or root of the thread by a length of cord wrapped around the sleeve to impart a desired corrugated shape. The rubber sleeve is then cured in this condition and the cord removed. The cured hose length may be removed from the mandrel and core strip in a number of ways such as by being blown off by air pressure from within the mandrel as described in U.S. Pat. No. 2,888,712.

The resulting corrugated helical hose length is both flexible and strong while at the same time maintaining its tubular form in a semirigid condition. This hose has particular application for use in domestic and industrial vacuum cleaners, as exhaust tubing, as tubing for ventilation systems as well as with other similar applications.

In the past such hose has had molded terminal connectors connected to both ends. This practice, however, requires that the hose be manufactured and sold in most cases in standard lengths and usually adjustments in length to suit specific requirements could not be made at the site of the installation. Also molded terminal connectors are difficult to manufacture and expensive.

The present invention reduces the difficulties indicted above and affords other features and advantages not obtainable from the prior art which greatly enhance the utility of flexible hose of the type described.

SUMMARY OF THE INVENTION

It is among the objects of the invention to provide an integral connecting means including a socket, at one end of a flexible length of helically corrugated hose, the socket being capable of receiving in threaded relation the opposite end of a similar length of hose of the same general size.

Another object is to facilitate the end-to-end interconnection of flexible lengths of helically corrugated hose without special molded sockets or the like at either end.

A further object is to provide an apparatus for manufacturing flexible lengths of such helically corrugated hose capable of end-to-end interconnection without complicated time-consuming procedures.

These and other objects and advantages are achieved by forming an enlarged corrugated end portion defining a female threaded socket in a length of flexible corrugated hose of the type described. The socket is formed so that a plurality of convolutions of the helical corrugations at the end have their internal threads formed with approximately the same crest and root diameters and pitch as the root and crest diameters, respectively, and pitch of the external threads of the rest of the hose length. Thus the opposite end of another similarly constructed hose length may be received in threaded relation within the socket, and yet the corrugations of the hose are of uniform pitch from one end of the hose to the other.

The apparatus forming the hose comprises an elongated helically corrugated form for receiving a raw rubber sleeve and for supporting the sleeve during curing to impart a helically corrugated shape, the form including an elongated cylindrical support mandrel and a core strip wrapped helically about the mandrel along a substantial portion of the total length thereof. The core strip is so contoured in section and so wrapped about the support member as to define a single continuous helical thread extending along a major portion of the mandrel.

According to the invention a tubular core member is provided at one end of the mandrel corresponding to the location of the female threaded socket. The tubular core member has an inner end and an outer end and is adapted to be secured to one end of the mandrel with the inner end in abutment and matching relation with the end of the core strip. The core member has a single external helical thread formed therein from end to end which is matched in thread diameter and pitch at the inner end to the thread diameter and pitch of the core strip. The thread defined by the core member increases progressively in diameter but maintains the same pitch toward the outer end to define a span of at least three convolutions at the outer end wherein the threads are enlarged so as to have with respect to the internal threads a crest diameter and root diameter approximately the same as the diameter and crest diameter, respectively, of the external threads over the remainder of the sleeve formed by cording the sleeve into helical corrugations.

DESCRIPTION OF THE PREFERRED EMBODIMENTS

Figure 2:
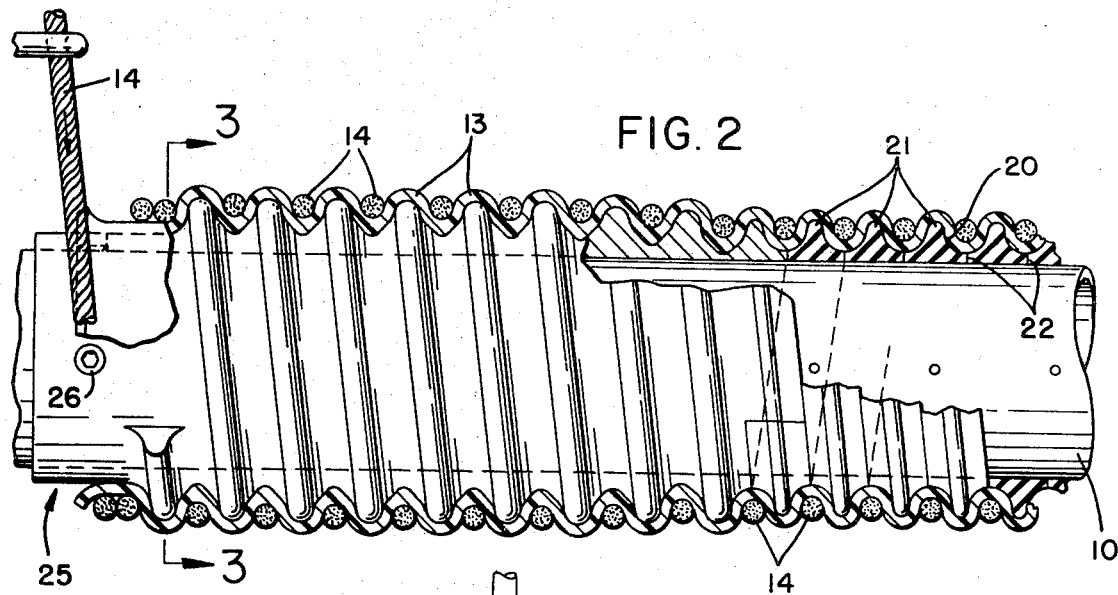
FIG. 2 is an elevational view on an enlarged scale of the left-hand end of the assembly of FIG. 1 with parts broken away and shown in section for the purpose of illustration.
Figure 3:
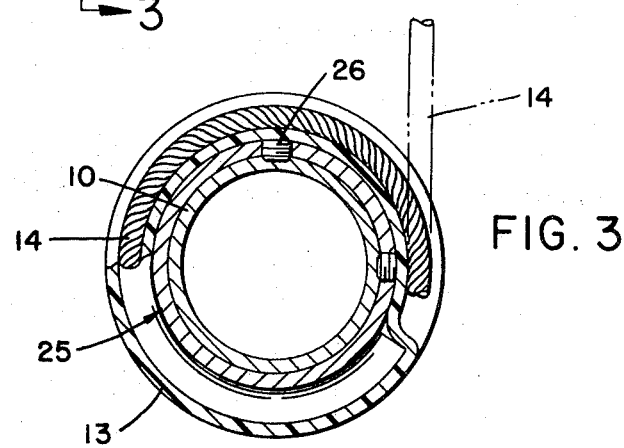
FIG. 3 is a transverse sectional view taken on line 3—3 of FIG. 2.
Figure 4:
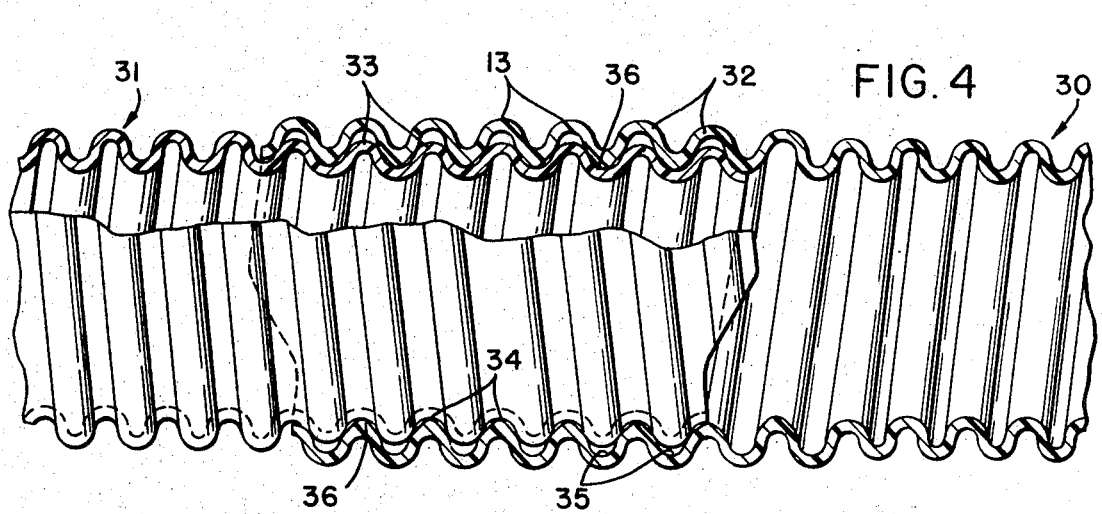
FIG. 4 is a fragmentary elevational view of a helically corrugated flexible hose length of the invention with the socket end thereof receiving an opposite end of a similarly formed hose length, parts being broken away and shown in section for the purpose of illustration.

Referring more particularly to the drawings FIGS. 1 to 3, 5 and 6 illustrate the apparatus for making a length of helically corrugated flexible tubing embodying the invention, while FIG. 4 illustrates the resulting product and the manner of its use.

THE FORMING APPARATUS

Figure 1:
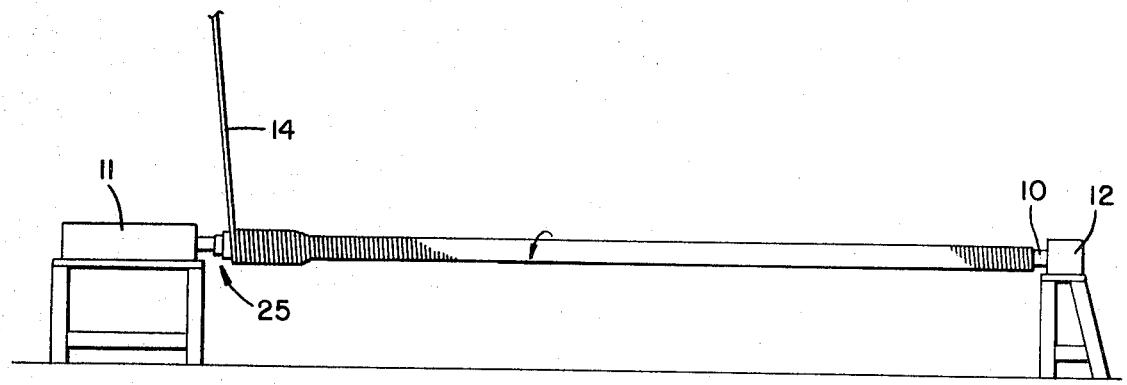
FIG. 1 shows an apparatus for wrapping a cord in helical fashion about an uncured rubber sleeve which is placed over a forming member defining an external helical thread which serves to form an internal helical thread in the sleeve when the sleeve is wrapped with the cord.

Referring to FIGS. 1 to 3 there is shown generally the manner in which the length of flexible corrugated hose is formed from an extruded sleeve of uncured rubber. FIG. 1 shows a tubular mandrel 10 mounted at one end in a rotary support 11 which supplies the rotary drive, and at the other end in an idling rotary support 12. The extruded raw rubber sleeve 13 is positioned over the mandrel 10 and a cord 14 is wrapped around the mandrel 10 to press the extruded sleeve 13 into a helical groove on the mandrel as best illustrated in FIG. 2. This procedure is illustrated and described in greater detail in U.S. Pat. No. 2,832,096. When the product has been generally formed as in FIG. 1 the mandrel 10, together with the sleeve 13 and cord 14 are removed from the rotary supports 11 and 12 and placed in a curing oven.

The helical thread on the mandrel for the extruded uncured rubber sleeve 13 is formed by wrapping a strip 20 of relatively hard flexible rubber around the mandrel 10 to define a single thread of uniform pitch. The core strip 20 has a central ridge which forms the helical crest 21 of the thread and the sides of the core strip 20 abut one another to define the helical root 22 of the thread.

The left-hand end of the mandrel 10 as viewed in FIGS. 1 and 2 is provided with a cast metal tubular core member 25 formed for example of aluminum and which slides over the mandrel 10 and is secured thereto by a setscrew 26. The outer surface of the core member 25 is formed to define a thread of the same pitch as the thread defined by the core strip 20 and the right-hand end of the core member is formed to abut the end of the strip 20 to continue of thread to the left-hand end of the mandrel 10.

Figure 5:
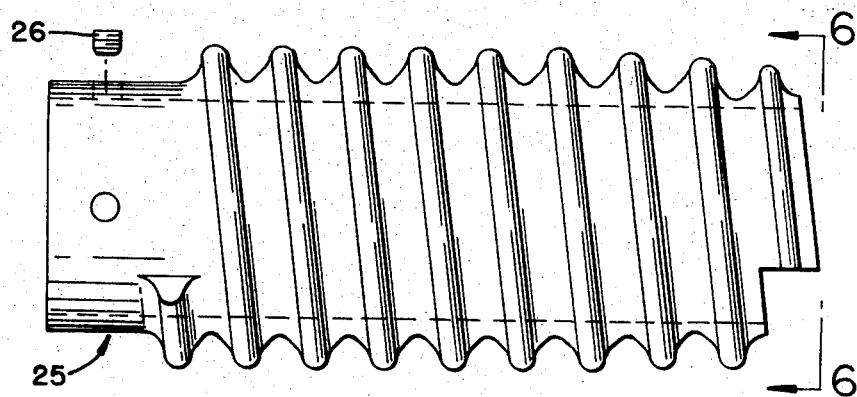
FIG. 5 is an elevational view of a cast metal core piece used to form the female socket of the hose length shown in FIG. 4 and which corresponds to the tubular core piece shown in FIG. 2.

The thread defined by the core member gradually increases in diameter from right to left for about the first four convolutions and reaches a maximum thread diameter extending for about six convolutions at the left-hand end of the mandrel. Thus the core member 25 provides a threaded core form adapted to enlarge the end of the uncured rubber sleeve 13 in such a way that the interior crest diameter and root diameter at the left-hand end thereof is essentially the same as the external crest and root diameter at the right-hand end thereof. The core member 25 is best illustrated in FIG. 5 where it will be seen that while the diameter of the thread increases gradually from right to left, the pitch or in other words the distance between adjacent crests remains constant.

Figure 7:
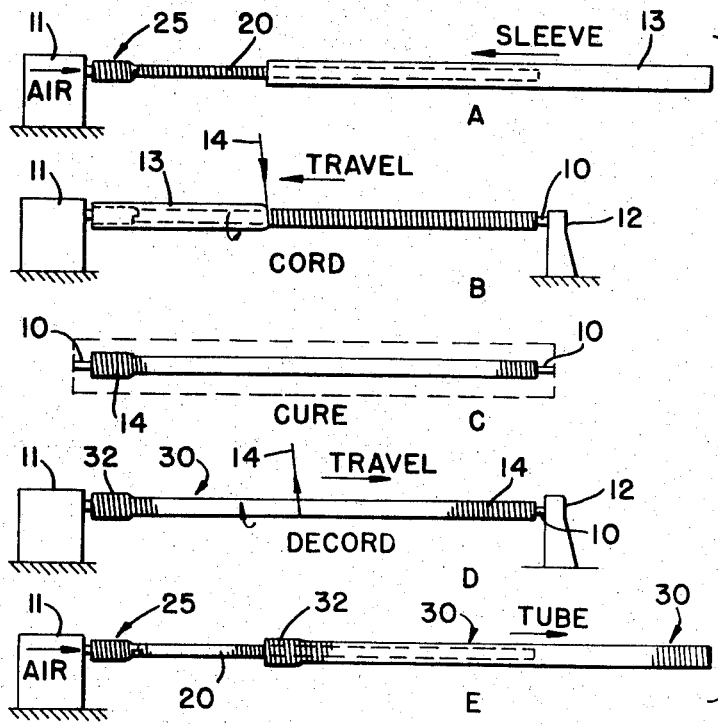
FIG. 7 is a series of elevational views in diagrammatic form illustrating the sequential steps for forming the product of FIG. 4 using the apparatus of FIGS. 1 to 3, 5 and 6.
Figure 6:
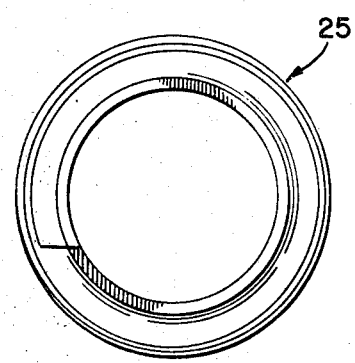
FIG. 6 is an elevational view of the core piece taken as indicated by the line 6—6 of FIG. 5.

The procedure for forming the flexible hose length and its integral socket is best illustrated sequentially in FIG. 7. It will be seen that the extruded raw rubber sleeve 13 is slid across the assembled mandrel 10 and core elements 20 and 25 (see A) and the movement of the sleeve 13 across the mandrel 10 and core elements 20 and 25 is facilitated by air pressure which is introduced through the mandrel 10 (see e.g., U.S. Pat. No. 2,888,712). Once the sleeve 13 is positioned on the mandrel 10 and core elements 20 and 25, the assembly is placed in the rotary mounts 11 and 12 at opposite ends and turned while the cord 14 is fed onto the sleeve 13 to press the sleeve into the helical groove or root of the thread (see B). After the cording has been completed, the assembly is placed in a curing oven where the rubber sleeve 13 is cured according to procedures and conditions well known in the rubber molding art (see C).

After curing, the cord 14 is removed from the assembly (see D) using for example the apparatus shown in U.S. Pat. No. 2,879,953. Finally the cured rubber hose is removed from the mandrel and core members (see E) for example by introducing air under fairly high pressure with the end of the tube blocked and thus in effect blowing the tube from the mandrel.

THE HELICALLY CORRUGATED HOSE LENGTH AND INTEGRAL SOCKET

The product of the invention is best illustrated in FIG. 4 which shows a length of hose 30 connected to the opposite end of a hose length 31 wherein the end portion forming the female connection serves as a threaded receptacle or socket 32 for the opposite end 33 of the joined rubber corrugated hose length 31.

Because the respective exterior crest and root diameters of the end portion 33 of the hose length 31 are approximately the same as the interior root and crest diameters respectively, of the socket 32, the interconnection affords a tight fit with the end portion 33 tightly secured within the threaded socket 32. At no point is there any reduction in the cross section of the resulting tubular conduit and thus there is no restriction to fluid flow through the conduit at the point of connection.

When an axial pulling force is applied tending to remove the end portion 33 from the socket 32 the resisting force will tend to stretch or elongate the socket 32 and correspondingly will tend to reduce its cross section and thus actually provide a firmer gripping of the end portion 33 to increase the frictional force tending to resist separation. Thus the greater the pulling force the greater the gripping force between the socket 32 and the end portion 33 received therein so that essentially a mechanical lock is provided.

The resistance to separation of the end portion 33 from the socket 32 is further augmented by the interlocking effect of the helical crests 34 and the helical grooves 35 of the internal thread of the socket 32 since the crests 34 extend into the grooves 36 between adjacent convolutions of the external thread of the end portion 33 and vice versa. Thus the crest diameter of the external threads of the end portion 33 is greater than the crest diameter of the internal threads of the socket 32. This provides a positive mechanical interference to resist separation of the hose end length 33 from the socket 32.

The hose is preferably made in lengths of 10 feet for the purpose of manufacturing convenience since longer lengths generally result in undesired whipping of the mandrel 10 during the cording process.

While the invention has been shown and described with reference to specific embodiments thereof this is intended for the purpose of illustration rather than limitation and variations and modifications will become apparent to those skilled in the art within the intended spirit and scope of the invention as herein specifically illustrated and described. Therefore the patent is not to be limited in scope and effect to the preferred forms shown herein nor in any other way that is inconsistent with the extent to which progress in the art has been advanced by the invention.

I claim:

1. A flexible elastomeric tubular hose having a substantially uniform wall thickness and having throughout its length helical corrugations defining both internal and external threads, the hose being of uniform diameter throughout the major portion of its length and having an enlarged portion of a plurality of convolutions at only one end of said hose, the crest and root diameters of the internal threads of said enlarged portion being the same dimensions as the root and crest diameters, respectively, of the external threads of said major portion of the hose, the threads being of uniform pitch throughout.

2. An article as defined in claim 1 wherein said enlarged portion comprises at least three convolutions of said corrugations.

3. An article as defined in claim 1 wherein the crest diameter of the internal threads of said enlarged position is less than the crest diameter of the external thread of said major portion of said hose.

* * * * *